United States Patent
Baduge et al.

(10) Patent No.: US 11,159,924 B2
(45) Date of Patent: Oct. 26, 2021

(54) ELECTRONIC TAG UPDATING METHOD AND ELECTRONIC TAG UPDATE SYSTEM

(71) Applicant: Panasonic Intellectual Property Management Co., Ltd., Osaka (JP)

(72) Inventors: Thilmee Malinda Baduge, Tokyo (JP); Nobutaka Kodama, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/959,238

(22) PCT Filed: Dec. 14, 2018

(86) PCT No.: PCT/JP2018/046001
§ 371 (c)(1),
(2) Date: Jun. 30, 2020

(87) PCT Pub. No.: WO2019/135339
PCT Pub. Date: Jul. 11, 2019

(65) Prior Publication Data
US 2020/0336869 A1 Oct. 22, 2020

Related U.S. Application Data
(60) Provisional application No. 62/613,594, filed on Jan. 4, 2018.

(51) Int. Cl.
*H04W 4/35* (2018.01)
*B65G 1/137* (2006.01)
*G06K 19/077* (2006.01)

(52) U.S. Cl.
CPC ............ *H04W 4/35* (2018.02); *B65G 1/1373* (2013.01); *G06K 19/07758* (2013.01)

(58) Field of Classification Search
CPC .............................. H04W 4/35; B65G 1/1373
(Continued)

(56) References Cited

U.S. PATENT DOCUMENTS 7,090,134 B2 * 8/2006 Ramsager ................. B07C 3/18
235/462.13
2007/0047459 A1 * 3/2007 Kadaba .................. G06Q 50/26
370/252
(Continued)

FOREIGN PATENT DOCUMENTS

JP 2007-334901 12/2007

OTHER PUBLICATIONS

International Search Report issued in International Patent Application No. PCT/JP2018/046001, dated Feb. 19, 2019, along with an English translation thereof.

*Primary Examiner* — Allyson N Trail
(74) *Attorney, Agent, or Firm* — Greenblum & Bernstein, P.L.C.

(57) ABSTRACT

There are an updating method of an electronic tag and an update system of the electronic tag performed by the electronic tag which displays sorting information, and a controller and an access point disposed inside a vehicle such as a truck. The controller requests an external server to transmit information on the electronic tag, and the sorting information corresponding to information on a parcel to which the electronic tag is fixed, and transmits the obtained sorting information to the access point. Further, the access point transmits the sorting information to the electronic tag, and the electronic tag updates the display of the sorting information. In this manner, the electronic tag can be updated by using an idle time during delivery.

6 Claims, 12 Drawing Sheets

(58) Field of Classification Search
USPC .......................................................... 235/385
See application file for complete search history.

(56) References Cited

U.S. PATENT DOCUMENTS

| | | | | |
|---|---|---|---|---|
| 2014/0180959 A1* | 6/2014 | Gillen | ................ | G06Q 10/0833 |
| | | | | 705/341 |
| 2016/0034764 A1* | 2/2016 | Connor | .............. | G06K 9/00771 |
| | | | | 348/158 |
| 2016/0104175 A1* | 4/2016 | Fanourgiakis | ..... | G06Q 10/0637 |
| | | | | 705/7.29 |
| 2020/0302389 A1* | 9/2020 | Wong | ................. | G07C 9/00309 |
| 2020/0302391 A1* | 9/2020 | Li | ........................ | G05D 1/0217 |
| 2020/0410446 A1* | 12/2020 | Rahilly | ................... | H04W 4/80 |

* cited by examiner

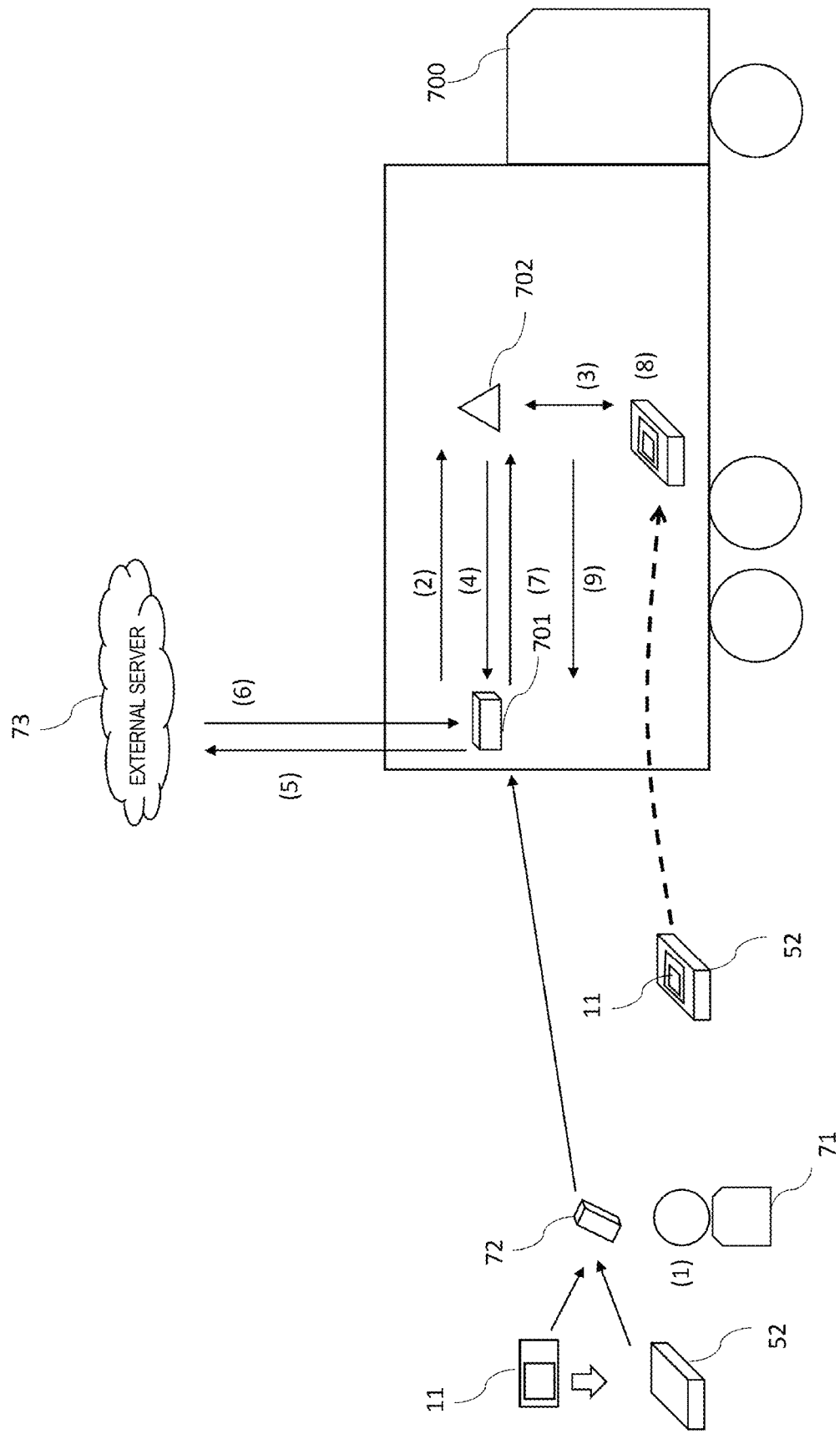

| TAG NUMBER | PHYSICAL ADDRESS | SYNCHRONIZATION TIME | BARCODE OF PARCEL | SAC | UPDATE |
|---|---|---|---|---|---|
| T1 | T1_ADDR | WUT1 | - | - | N |
| T2 | T2_ADDR | WUT2 | - | - | N |
| T3 | T3_ADDR | WUT3 | - | - | N |
| ... | ... | ... | ... | ... | ... |

FIG. 8C

| TAG NUMBER | PHYSICAL ADDRESS | SYNCHRONIZATION TIME | BARCODE OF PARCEL | SAC | UPDATE |
|---|---|---|---|---|---|
| T1 | T1_ADDR | WUT1 | P1_BC | T1_SAC | N |
| T2 | T2_ADDR | WUT2 | - | - | N |
| T3 | T3_ADDR | WUT3 | - | - | N |
| ... | ... | ... | ... | ... | ... |

US 11,159,924 B2

ELECTRONIC TAG UPDATING METHOD AND ELECTRONIC TAG UPDATE SYSTEM

TECHNICAL FIELD

The present disclosure relates to an electronic tag updating method and an electronic tag update system useful to sort or deliver parcels (hereinafter, simply referred to as sorting).

BACKGROUND ART

As recent economic activity rises, the amount of parcel circulation tends to increase. In a circulation process of parcels, sorting work for sorting the parcel by destination is a time-consuming process.

PTL 1 discloses a system in which moving parcel is traced, an image to be displayed is determined based on information related to the parcel read from the parcel and information of a position of the parcel, and the image is projected from a projector on the parcel to display the image on the parcel.

CITATION LIST

Patent Literature

PTL 1: U.S. Pat. No. 7,090,134

SUMMARY OF THE INVENTION

Meanwhile, in recent years, the amount of parcel circulation has been increased more and more and types of parcel have also become various, so that a technology of effectively and precisely sorting the parcel is required.

The present disclosure relates to an electronic tag technology of effectively and precisely sorting the parcel.

BRIEF DESCRIPTION OF DRAWINGS

FIG. 7A is a conceptual diagram for explaining an update of an electronic tag according to the present disclosure in a truck.

FIG. 8B is a diagram illustrating contents of a database of a controller in step (1).

FIG. 8C is a diagram illustrating contents of the database of the controller after step (5).

DESCRIPTION OF EMBODIMENTS

Hereinafter, embodiments (hereinafter, referred to as "present embodiment") which specifically disclose an electronic tag and a control method of the electronic tag according to the present disclosure will be described in detail with reference to appropriate drawings. However, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to the drawings.

[Configuration of Electronic Tag]

Hereinafter, the electronic tag according to the embodiments of the present disclosure will be described with reference to FIGS. 1 to 4.

Figure 1:
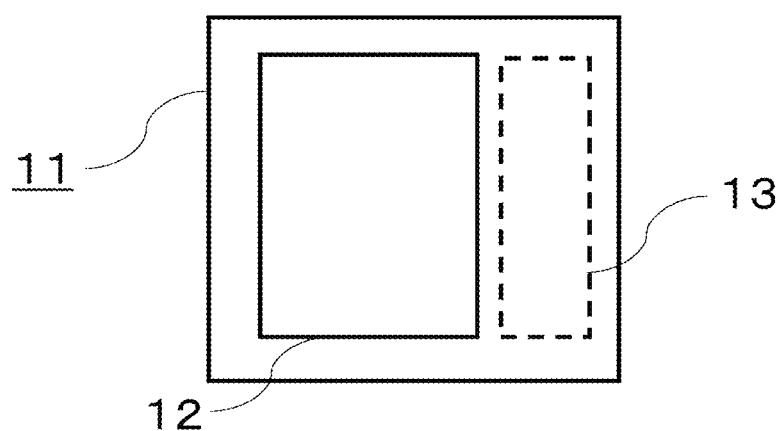
FIG. 1 is a schematic diagram illustrating an appearance of an electronic tag according to the present disclosure.

FIG. 1 is a schematic diagram illustrating an appearance of an electronic tag according to the present disclosure. Electronic tag 11 (also referred to as Electronic Sort Assist Tag (ESAT)) generally includes a display apparatus and other elements. In the example illustrated in FIG. 1, an object visually recognized by a user is a display and an exterior, and other elements are housed inside the electronic tag. Input devices (buttons, touch panels, pointers) necessary for an input operation to the electronic tag may be disposed at positions at which the input devices can be visually recognized by the user as necessary, but the input devices are not illustrated in the present disclosure.

Display 12 is an apparatus which displays images, characters, and the like. In the present disclosure, an example in which electronic paper is used as an example of a display apparatus will be described.

Element 13 includes electronic components (Near Field Communication (NFC) module, Wireless Fidelity (WiFi) module, a programmed Central Processing Unit (CPU), and the like necessary for realizing a technology according to the present disclosure.

Figure 2:
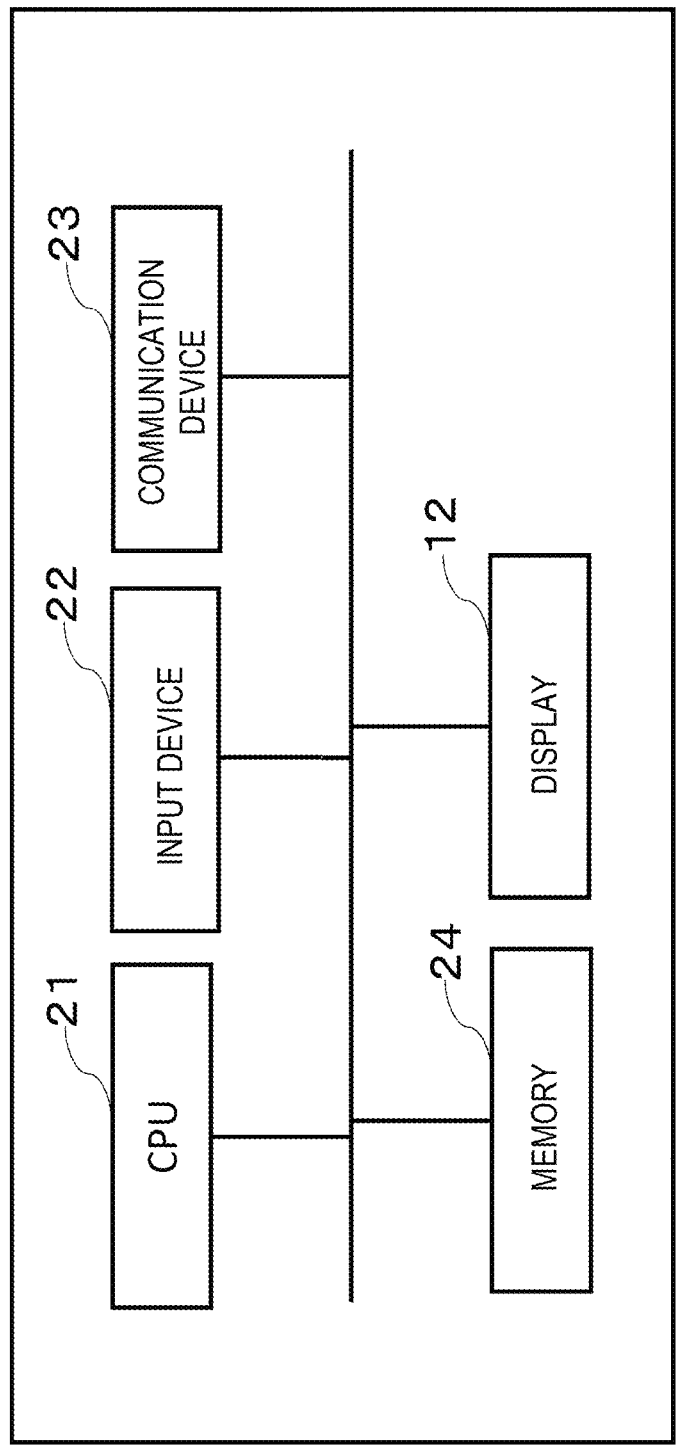
FIG. 2 is a block diagram of the electronic tag according to the present disclosure.

FIG. 2 is a block diagram of the electronic tag according to the present disclosure.

CPU 21 controls other elements of the electronic tag.

Input device 22 includes a button, a touch panel, a pointer, and the like. An input to the input device 22 is transmitted to CPU 21, and CPU 21 controls other elements based on the input.

Communication device 23 includes a communication module such as an NFC module, a WiFi module, and the like. Contents received by communication device 23 is transmitted to CPU 21, and CPU 21 controls other elements based on the content. The communication device is controlled by CPU 21 to transmit information to another device.

Memory 24 is a general term for permanently or temporarily recording contents (a Read Only Memory (ROM) and a Random Access Memory (RAM)), and includes a Solid State Drive (SSD), a Hard Disk Drive (HDD), a Dynamic RAM (DRAM), and the like. CPU 21 controls other elements based on information recorded in memory 24. The information is written into memory 24 under the control of CPU 21.

In the same manner, display 12 described above displays information under the control of the CPU.

Figure 3:
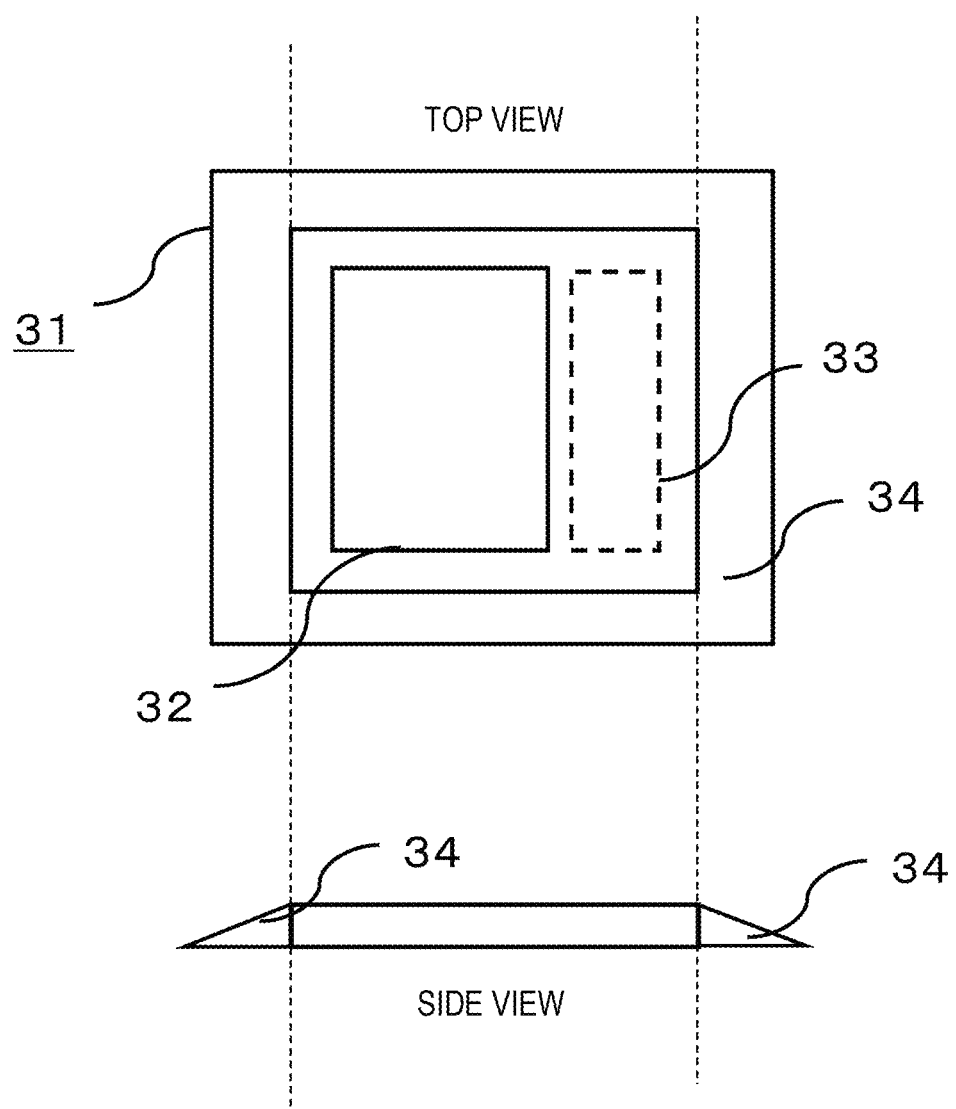
FIG. 3 is a schematic diagram illustrating an appearance of another example of the electronic tag according to the present disclosure.

FIG. 3 is a schematic diagram illustrating an appearance of another example of the electronic tag according to the present disclosure.

A structure of electronic tag 31 illustrated in FIG. 3 is different from that of electronic tag 11 illustrated in FIG. 1. On the other hand, functionally, electronic tag 31 includes display 32 and component 33 in the same manner as FIG. 1.

In the structure of the electronic tag illustrated in FIG. 3, a top view is approximately the same as FIG. 1. Meanwhile, in the electronic tag illustrated in FIG. 3, outer edge portion 34 of the electronic tag has a downward slope as illustrated in the side view. In this manner, there is an advantage that when the electronic tag is attached to a parcel, the edge can be prevented from contacting with other parcels.

Figure 4:
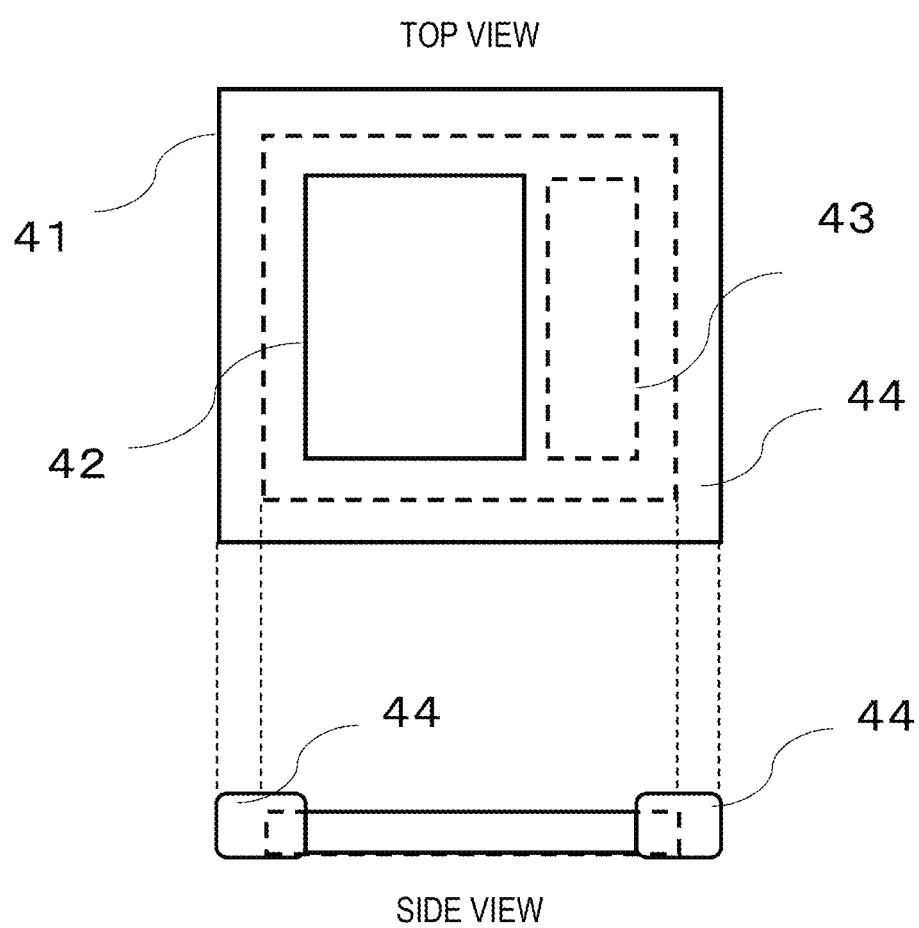
FIG. 4 is a schematic diagram illustrating an appearance of still another example of the electronic tag according to the present disclosure.

FIG. 4 is a schematic diagram illustrating an appearance of still another example of the electronic tag according to the present disclosure.

A structure of electronic tag 41 illustrated in FIG. 4 is different from that of electronic tag 11 illustrated in FIG. 1. On the other hand, functionally, electronic tag 41 includes display 42 and component 43 in the same manner as FIG. 1.

In the structure of the electronic tag illustrated in FIG. 4, a top view is approximately the same as FIG. 1. In the electronic tag illustrated in FIG. 4, as illustrated in the side view, shock absorbing member 44 (for example, a rubber bumper) is disposed at an outer edge portion of the electronic tag. In this manner, when the electronic tag is attached to a parcel, it is possible to prevent the electronic tag from being broken by the impact on the parcel.

[Attachment of Electronic Tag to Parcel]

Attachment of the electronic tag according to the embodiment of the present disclosure to a parcel will be described with reference to FIGS. 5A, 5B, 5C, 6A, 6B, and 6C.

Figure 5A:
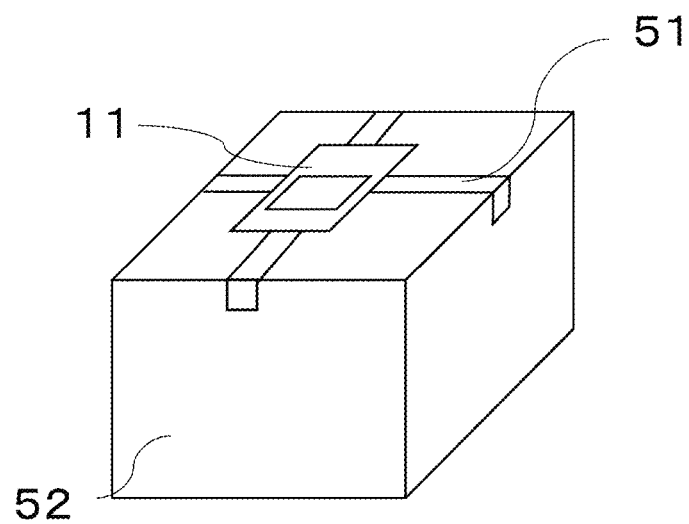
FIG. 5A is a conceptual diagram illustrating a state in which an electronic tag according to the present disclosure is attached to a parcel by using an adjustable material.
Figure 5B:
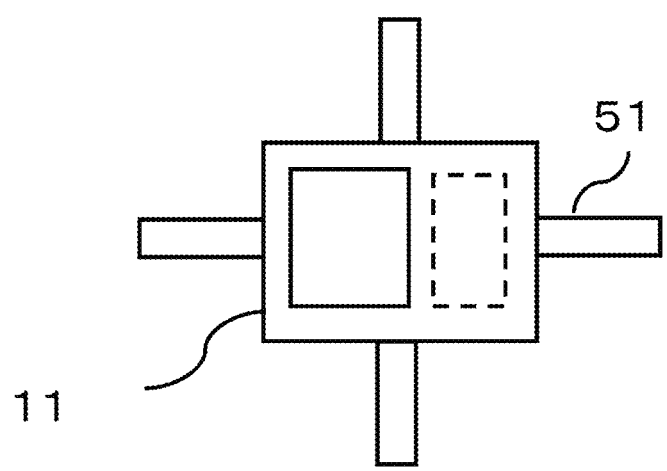
FIG. 5B is a conceptual diagram illustrating the state in which the electronic tag according to the present disclosure is attached to the parcel by using the adjustable material.
Figure 5C:
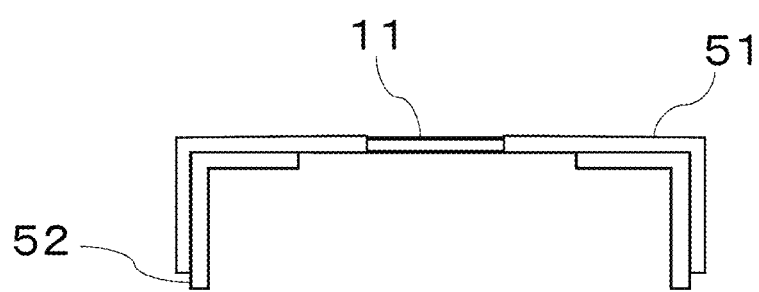
FIG. 5C is a conceptual diagram illustrating the state in which the electronic tag according to the present disclosure is attached to the parcel by using the adjustable material.

FIGS. 5A, 5B, and 5C are conceptual diagrams illustrating a state in which the electronic tag according to the present disclosure is attached to a parcel by using an adjustable material. As illustrated in the perspective view illustrated in FIG. 5A, the top view illustrated in FIG. 5B, and the side view illustrated in FIG. 5C, electronic tag 11 is attached to parcel (box) 52 via leg-shaped adjustable material 51. In this manner, it is not necessary to attach electronic tag 11 directly to parcel 52, so that electronic tag 11 can be easily reused. In addition, the degree to which vibration of parcel 52 is propagated to electronic tag 11 can be reduced. Further, since attachment of electronic tag 11 is completed by fixing adjustable material 51 to parcel 52, the attachment of electronic tag 11 can be performed without depending on a size of parcel 52. As a specific material constituting adjustable material 51, a plastic in which a spring or the like is charged, a plastic rubber in which a slider structure is formed, a woven fiber, and the like can be considered. Various methods can be considered for fixing adjustable material 51 to parcel 52. As an example, (1) a part of adjustable material 51 has a hook-shape and the part is hooked on parcel 52 (2) adjustable material 51 is formed in a loop shape and wrapped around parcel 52 (3) a part of adjustable material 51 has an adhesive property or a structure similar to a fastener tape and the part is fixed by surface contact with parcel 52, and the like can be considered. Various methods for fixing electronic tag 11 to adjustable material 51 can be considered. As an example, (1) a part of electronic tag 11 or adjustable material 51 has a hook-shape and the part is hooked on the other (2) adjustable material 51 has a loop shape and is wrapped around the parcel (3) a part of electronic tag 11 or adjustable material 51 has an adhesive property or a structure similar to a fastener tape and the part is fixed by surface contact with the other (4) dedicated lock structures are provided in both of an electronic tag 11 and adjustable material 51, and the like can be considered.

Figure 6A:
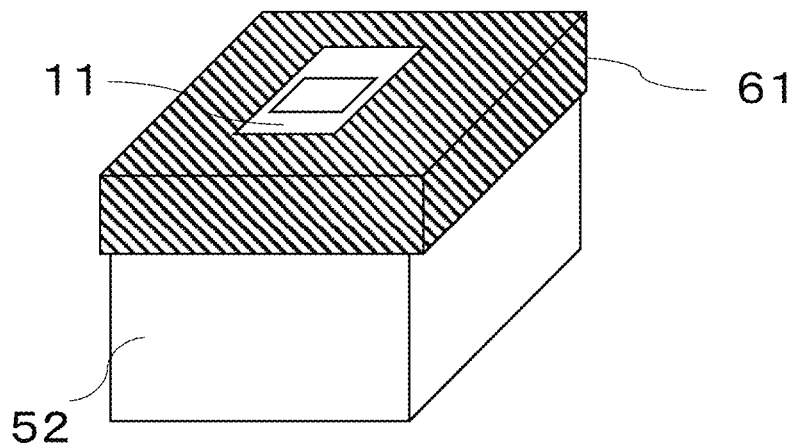
FIG. 6A is a conceptual diagram illustrating a state in which an electronic tag according to the present disclosure is attached to a parcel by using a stretch cap.
Figure 6B:
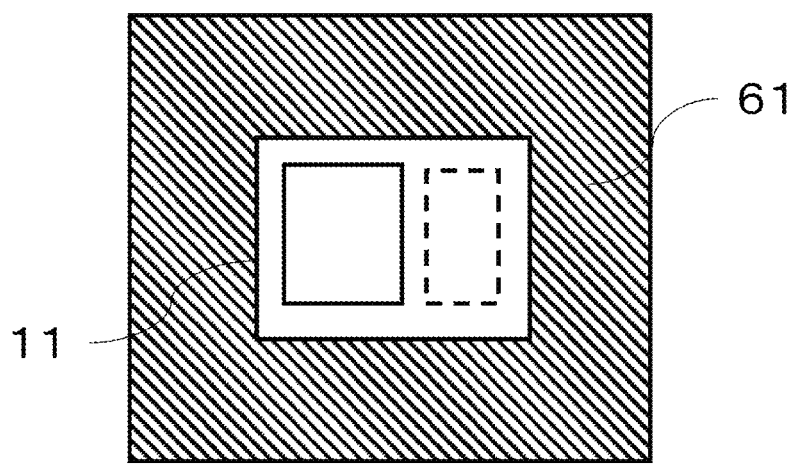
FIG. 6B is a conceptual diagram illustrating the state in which the electronic tag according to the present disclosure is attached to the parcel by using the stretch cap.
Figure 6C:
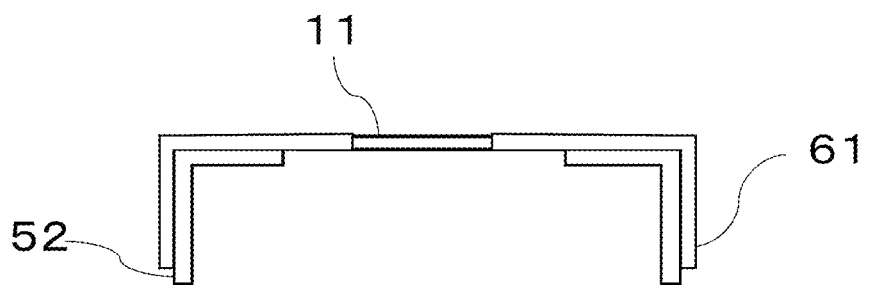
FIG. 6C is a conceptual diagram illustrating the state in which the electronic tag according to the present disclosure is attached to the parcel by using the stretch cap.

FIGS. 6A, 6B, and 6C are conceptual diagrams illustrating a state in which the electronic tag according to the present disclosure is attached to a parcel by using a stretch cap. As illustrated in the perspective view illustrated in FIG. 6A, the top view illustrated in FIG. 6B, and the side view illustrated in FIG. 6C, electronic tag 11 is attached to parcel 52 via hat-shaped stretch cap 61. In this manner, it is not necessary to attach electronic tag 11 directly to the parcel, so that the electronic tag can be easily reused. In addition, the degree to which vibration of the parcel is propagated to electronic tag 11 can be reduced. Further, since attachment of electronic tag 11 is completed by covering the parcel with stretch cap 61, the attachment of electronic tag 11 can be performed without depending on a size of parcel 52. As an example of a method of fixing stretch cap 61 to the parcel, it is considered to push stretch cap 61 in a contracted state to spread and cover the parcel. Various methods for fixing electronic tag 11 to stretch cap 61 can be considered. As an example, (1) a part of electronic tag 11 or stretch cap 61 has a hook-shape and the part is hooked to the other (2) a part of electronic tag 11 or stretch cap 61 has an adhesive property or a structure similar to a fastener tape and the part is fixed by surface contact with the other (3) dedicated lock structures are provided in both of an electronic tag 11 and stretch cap 61, and the like can be considered.

[Operation of Electronic Tag]

On the electronic tag according to the present disclosure, information useful for sorting performed in a sorting factory, near a sorting (delivery) truck, in a delivery factory, at a delivery source, at a delivery destination, and the like (also simply referred to as sorting information) (sort assist content (SAC)) is displayed. An example of the information useful for sorting can include, information on a conveyor, on which a parcel is to be carried, in the sorting factory information on a position at which a parcel is loaded on the truck information on a delivery factory (or a sorting factory) to be delivered (such as load door)

information for specifying a delivery source and a delivery destination, or specifying a group to which the delivery source and the delivery destination belong.

Hereinafter, how these SACs are displayed on the electronic tag will be described with reference to a plurality of examples, mainly for each update timing of the electronic tag.

[Update in Truck]

FIG. 7A is a conceptual diagram for explaining an update of the electronic tag according to the present disclosure in a truck. Controller 701 and access point 702 are disposed in truck 700. The controller is a computer having a memory, a CPU, and the like. The access point has a communication function.

The update of the electronic tag in the truck is performed as follows. Contents of data common to each example and details of a procedure of a data update are interpreted with reference to the descriptions in FIGS. 8A, 8B, 8C, and 9.

Step (1): worker 71 picks up electronic tag 11. Worker 71 uses information reading apparatus 72 at hand to read information (for example, a barcode) of parcel 52 and electronic tag 11. The read information is transmitted to controller 701 in truck 73. Worker 71 attaches electronic tag 11 to parcel 52 by the method described above. Worker 71 loads parcel 52 on truck 73.

Step (2): controller 701 sends a request to access point 702 to synchronize with electronic tag 11.

Step (3): electronic tag 11 synchronizes with access point 702. This synchronization enables electronic tag 11 and access point 702 to communicate with each other. Electronic tag 11 attempts to synchronize with access point 702 at predetermined intervals (as an example, 15 seconds). Since the predetermined interval is also known in access point 702, the predetermined interval is designed so that the synchronization is completed within 15 seconds for all the electronic tags.

Step (4): access point 701 notifies electronic tag 11 that the synchronization has been achieved.

Step (5): controller 701 requests external server (Sort Decision Server) 73 to transmit the SAC for electronic tag 11. Here, the SAC related to electronic tag 11 of which an update is confirmed in step (9) described below may be excluded from the transmission request to external server 73. In this manner, in addition to reducing the amount of communication of the controller 701, the number of times electronic tag 11 is updated is also reduced, so that it is possible to reduce power consumption of electronic tag 11. Further, a timing at which controller 701 requests external server 73 to transmit the SAC of electronic tag 11 may be after a predetermined time elapses (for example, after 3:00 pm). This predetermined time is a time at which the SAC is updated in external server 73. In this manner, in addition to reducing the amount of communication of controller 701, the number of times electronic tag 11 is updated is also reduced, so that it is possible to reduce power consumption of electronic tag 11. Further, controller 701 periodically requests external server 73 to transmit the SAC of electronic tag 11.

Figure 7B:
FIG. 7B is a diagram illustrating a database related to a tag synchronized with access points in a controller.

Step (6): external server 73 returns a SAC to controller 701. FIG. 7B illustrates a database related to the tag to which the access point in the controller is synchronized (a database in the same manner is also held in external server 73 in synchronization). In the database, an electronic tag number (a numerical value unique to electronic tag 11), a physical address of electronic tag 11 (such as indicated by a barcode of the electronic tag), a synchronization time (a Wake up time) with the electronic tag, information on parcel 52 to which electronic tag 11 is attached (as an example, a barcode of the parcel), an SAC displayed on electronic tag 11, information indicating whether or not electronic tag 11 is updated, and the like are stored in association with each other. The SAC for electronic tag 11 is determined in external server 73 based on parcel information. As illustrated in FIG. 7B, in electronic tags T2 and T3, since an SAC is not yet determined in external server 73, the SAC is not transmitted.

Step (7): controller 701 transmits the SAC received in step (6) to access point 702. Controller 701 instructs access point 702 to cause electronic tag 11 to update the SAC.

Step (8): electronic tag 11 which receives the SAC from access point 702 displays the SAC. Electronic tag 11 notifies access point 702 that the update is completed.

Step (9): access point 702 notifies controller 701 of information indicating electronic tag 11 in which the update is completed (the table illustrated in FIG. 7B is updated based on the information).

According to the above-described method of updating the electronic tag in the truck, electronic tag 11 can be effectively updated by using an idle time, which is a delivery time. Further, in addition to the above configuration, other configurations may be added. For example, by obtaining information indicating whether or not truck 700 has been arrived at a pickup destination from a geographic sensor, a driver, or the like separately disposed in the truck, electronic tag 11 can be updated more effectively. For example, in a case where not all of electronic tags 11 has not been updated even though truck 700 has arrived at the pickup destination, a notification may be output to the outside (a display, a speaker, or the like) so that the parcel to which the tag is attached is not to be unloaded from the truck until an update of all electronic tags 11 or an update of electronic tag 11 of which the update has not been completed is completed.

[Update in Sorting Factory]

Figure 8A:
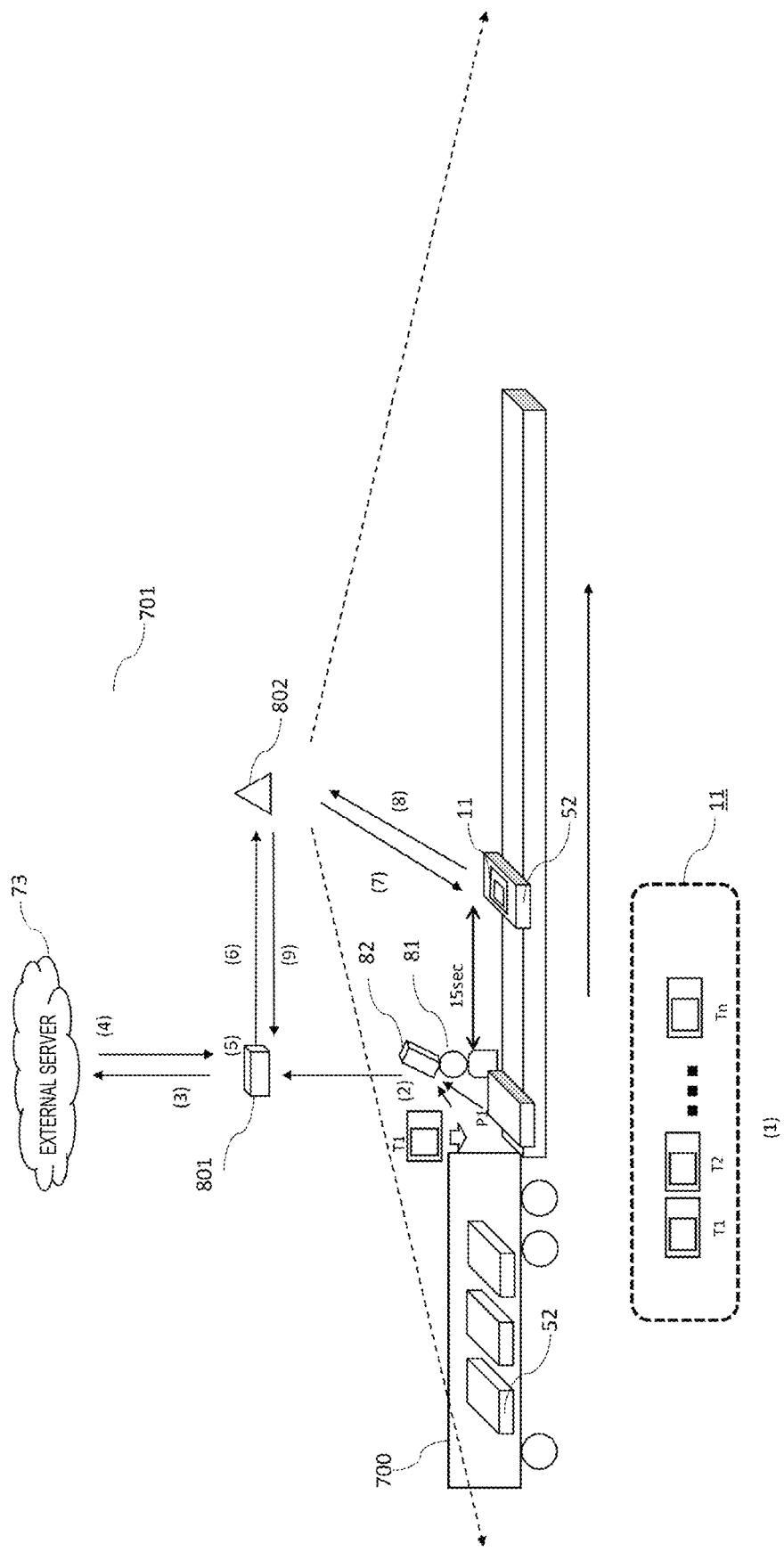
FIG. 8A is a conceptual diagram for explaining an update of an electronic tag according to the present disclosure in a sorting factory.

FIG. 8A is a conceptual diagram for explaining an update of the electronic tag according to the present disclosure in a sorting factory. In the factory, controller 801 and access point 802 are disposed. Controller 801 is a computer having a memory, a CPU, and the like. Access point 802 has a communication function. Further, in the factory, a conveyor is disposed near a truck unloading area.

The update in FIG. 8A may be substituted with the update in the truck illustrated in FIG. 7A, and also may be compatible to complement the update in the truck illustrated in FIG. 7A.

The update of the electronic tag in the sorting factory is performed as follows. In some cases, a description of the same or similar items as those described in the above-described update in the truck is omitted. Further, in some cases, details are described more than FIGS. 7A and 9, and in this case, the description is also used as an explanation in FIGS. 7A and 9. Contents of data common to each example and details of a procedure of a data update are interpreted with reference to the descriptions in FIGS. 7A and 9.

Step (1): synchronization of each electronic tag 11 is performed with access point 802 in the factory. Electronic tag 11 attempts to synchronize with access point 802 at predetermined intervals (as an example, 15 seconds). Since the predetermined interval is also known in access point 802, the predetermined interval is designed so that the synchronization is completed within 15 seconds for all electronic tags 11. This step is performed as preparation for the following steps.

Step (2): worker 81 picks up electronic tag 11 (for example, electronic tag T1). Worker 81 reads information of parcel 52 (for example, P1) and electronic tag 11 (for example, a barcode of electronic tag 11) by using information reading apparatus 82 at hand. The read information is transmitted to controller 801 in the factory. Worker 81 attaches electronic tag 11 to parcel 52.

Step (3): controller 801 requests external server 73 for an SAC of electronic tag 11 read in step (2).

Step (4): external server 73 returns the SAC to controller 801.

Step (5): controller 801 updates the SAC in a database recorded in controller 801. FIG. 8B is a diagram illustrating contents of the database of the controller in step (1), and FIG. 8C is a diagram illustrating contents of the database of the controller after step (5). As can be seen by comparing both the databases, the SAC of electronic tag T1 is updated in the database illustrated in FIG. 8C.

Step (6): controller 801 transmits the SAC to access point 802.

Step (7): access point 802 transmits the SAC to electronic tag 11. At this time, controller 801 notifies access point 802 of a synchronization time of each electronic tag 11 recorded in the DB in controller 801 in advance, and access point 802 transmits each SAC at each time corresponding to the synchronization time, so that it is possible to reduce the communication capacity required by access point 802. In addition, a physical address of each electronic tag 11 is added to the SAC and the SAC is transmitted to electronic tag 11. In this manner, it is easier to prevent electronic tag 11 other than electronic tag 11 which is a transmission destination from receiving the SAC by mistake.

Step (8): electronic tag 11 which receives the SAC displays the SAC transmitted from access point 802. Electronic tag 11 notifies access point 802 that the update is completed. If this notification is performed within an interval (for example, 15 seconds) between the SAC is received and electronic tag 11 is updated, it is possible to prevent step (8) from being performed repeatedly.

Step (9): access point 802 notifies the controller of information indicating a tag of which the update is completed (the Table is updated based on the information).

According to the above-described method of updating the electronic tag in the sorting factory, electronic tag 11 can be effectively updated by using an idle time, which is a time immediately after unloading. Further, in addition to the above configuration, other configurations may be added. For example, by directing an antenna of access point 802 so that a long-axis direction of the antenna is oriented in a traveling direction of the conveyor, it is possible to prevent an update miss of the tag even if the number of electronic tags 11 increases. The broken line arrow extending from access point 802 illustrated in FIG. 8A is an image of a directivity range generated by directing the antenna so that the long-axis direction is oriented in the traveling direction of the conveyor.

[Method of Updating SAC at Same Time as Electronic Tag 11 is Picked Up]

Figure 9:
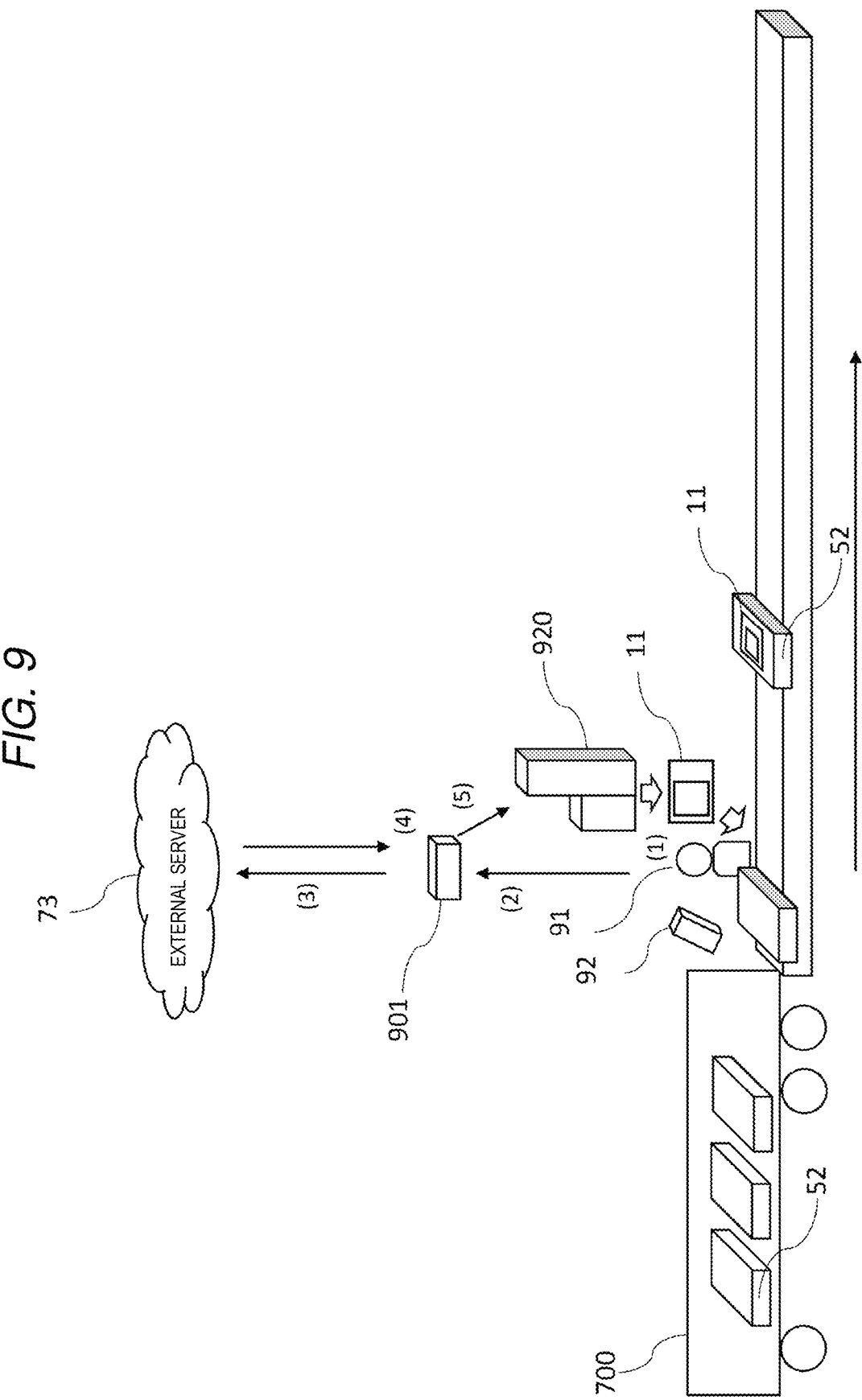
FIG. 9 is a conceptual diagram for explaining a method of updating an SAC at the same time as an electronic tag is picked up.

A method of updating an SAC at the same time as electronic tag 11 is picked up will be described with reference to FIG. 9. FIG. 9 is a conceptual diagram for explaining a method of updating an SAC at the same time as an electronic tag is picked up.

Steps of updating the SAC at the same time as the pickup of electronic tag 11 is performed as follows. In some cases, a description of the same or similar items as those described above is omitted. Further, in some cases, details are described more than FIGS. 7A and 8A, and in this case, the description is also used as an explanation in FIGS. 7A and 8A. Contents of data common to each example and details of a procedure of a data update are interpreted with reference to the descriptions in FIGS. 7A and 8A.

Step (1): worker 91 uses information reading apparatus 92 at hand to read information (for example, a barcode) of parcel 52 and electronic tag 11.

Step (2): the information read in step (1) is transmitted to controller 901.

Step (3): controller 901 transmits the information received in step (2) to external server 73, and requests external server 73 for an SAC related to parcel 52 corresponding to the information.

Step (4): controller 901 receives the SAC.

Figure 10:
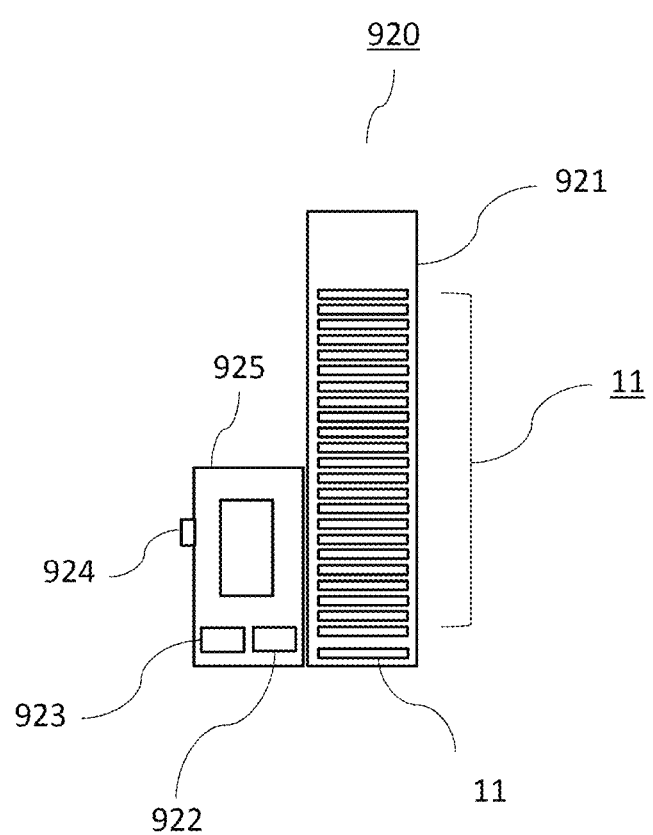
FIG. 10 is a diagram illustrating a configuration of a tag ejector according to the present disclosure.

Step (5): controller 901 transmits the received SAC to tag ejector 920. FIG. 10 is a diagram illustrating a configuration of tag ejector 920 according to the present disclosure. Tag ejector 920 is roughly divided into portion 921 which stores electronic tag 11 and portion 925 (on left side in the drawing) having Near Field Communication (NFC) writer 922, information reading apparatus 923, and trigger button 924. Tag ejector 920 also has a configuration having a computer function such as a memory and a CPU. The SAC is stored in a memory of tag ejector 920. The SAC stored in the memory is transmitted to NFC writer 922 as write schedule information. From tag ejector 920, electronic tag 11 which is first input to tag ejector 920 (the lower electronic tag in FIG. 10) is ejected in order from an outlet disposed near NFC writer 922.

Step (6): worker 91 presses trigger button 924 of tag ejector 920.

Step (7): due to trigger button 924 being pressed, information (as an example, a barcode) of parcel 52 necessary for constituting the SAC is read by information reading apparatus 923 (as an example, a barcode reader) of the tag ejector illustrated in FIG. 10. Further, in parallel with these series of operations, electronic tag 11 (the lowermost one) in FIG. 10 is moved from under the tag ejector to near NFC writer 922, and the SAC received from controller 901 or the external server 73 is written from NFC writer 922 to electronic tag 11 before being ejected. Since these three operations are quickly performed as a series of operations caused by pressing one trigger button, electronic tag 11 with SAC can be effectively attached to box 52 without stopping the flow of the parcels.

Step (8): electronic tag 11 is ejected from tag ejector 920 and is attached to the parcel. As described above, by updating the SAC at the same time as the pickup of electronic tag 11, communication equipment can be simplified. In addition, the SAC can be more reliably recorded on the tag.

SUMMARY

As described above, an electronic tag attachment structure according to the present disclosure includes an electronic tag, a flexible intermediary member typified by an adjustable material or a stretch material which detachably fixes the electronic tag, and a fixing member (a hook, a loop structure, an adhesive material, a fastener tape, or the like) provided in the intermediary member and detachably fixed to an attachment target object (an parcel or the like).

In this manner, the electronic tag can be attached to the attachment target object of any size while enabling the electronic tag to be easily removed from the attachment target object. In addition, reusability of the intermediary member can be improved.

In addition, an electronic tag updating method/system according to the present disclosure is an updating method of an electronic tag performed by the electronic tag which displays sorting information, and a controller and an access point disposed inside a vehicle such as a truck. The controller requests an external server to transmit information on the electronic tag, and the sorting information corresponding to information on a parcel to which the electronic tag is fixed, and transmits the obtained sorting information to the access point. Further, the access point transmits the sorting information to the electronic tag, and the electronic tag updates the display of the sorting information.

In this manner, the electronic tag can be updated by using an idle time during delivery.

In addition, as described above, in the electronic tag updating method/system according to the present disclosure, the electronic tag notifies the access point that the display of the sorting information is updated as a completion notification, the access point transmits, information related to the electronic tag from which the completion notification is received, to the controller, and the controller requests the external server to transmit the sorting information by excluding the sorting information displayed on the electronic tag from which the completion notification is received.

In this manner, it is possible to reduce the amount of communication between the electronic tag and the access point.

Further, as described above, in the electronic tag updating method/system according to the present disclosure, the vehicle generates arrival information indicating whether or not the vehicle reaches a destination, and in a case where the electronic tag which has not notified the completion notification exists in the vehicle and the arrival information indicates that the vehicle reaches the destination, the vehicle performs an output so that the electronic tag which has not notified the completion notification is not to be unloaded from the vehicle.

In this manner, it is possible to more reliably cause the electronic tag to display the latest sorting information.

Further, as described above, in the electronic tag updating method/system according to the present disclosure, until a predetermined time elapses, the controller may not request the external server to transmit the sorting information. In this manner, it is possible to prevent the controller from accessing the external server until the update of the sorting information is not yet completed in the external server.

INDUSTRIAL APPLICABILITY

The electronic tag updating method and the electronic tag update system according to the present disclosure are useful to sort or deliver parcels.

REFERENCE MARKS IN THE DRAWINGS

11 ELECTRONIC TAG
51 ADJUSTABLE MATERIAL
52 BOX
61 STRETCH CAP
920 TAG EJECTOR

The invention claimed is:

1. An electronic tag updating method performed by an electronic tag which displays sorting information, and a controller and an access point disposed inside a vehicle, the method comprising:
requesting an external server to transmit information on the electronic tag, and the sorting information corresponding to information in a parcel to which the electronic tag is fixed, and transmitting the obtained sorting information to the access point by the controller;
transmitting the sorting information to the electronic tag by the access point; and
updating the display of the sorting information by the electronic tag,
wherein the electronic tag notifies the access point that the display of the sorting information is updated as a completion notification,
the access point transmits, information related to the electronic tag from which the completion notification is received, to the controller, and
the controller requests the external server to transmit the sorting information by excluding the sorting information displayed on the electronic tag from which the completion notification is received.

2. The electronic tag updating method of claim 1, wherein the vehicle generates arrival information indicating whether or not the vehicle reaches a destination, and
in a case where the electronic tag which has not notified the completion notification exists in the vehicle and the arrival information indicates that the vehicle reaches the destination,
the vehicle performs an output so that the electronic tag which has not notified the completion notification is not to be unloaded from the vehicle.

3. The electronic tag updating method of claim 1, wherein until a predetermined time elapses,
the controller does not request the external server to transmit the sorting information.

4. An electronic tag update system comprising:
an electronic tag which displays sorting information;
a controller disposed inside a vehicle; and
an access point disposed inside the vehicle,
wherein the controller requests an external server to transmit information on the electronic tag, and the sorting information corresponding to information on a parcel to which the electronic tag is fixed, and transmits the obtained sorting information to the access point,
the access point transmits the sorting information to the electronic tag, and
the electronic tag updates the display of the sorting information,
wherein the electronic tag notifies the access point that the display of the sorting information is updated as a completion notification,
the access point transmits, information related to the electronic tag from which the completion notification is received, to the controller, and
the controller requests the external server to transmit the sorting information by excluding the sorting information displayed on the electronic tag from which the completion notification is received.

5. The electronic tag update system of claim 4, wherein the vehicle generates arrival information indicating whether or not the vehicle reaches a destination, and
in a case where the electronic tag which has not notified the completion notification exists in the vehicle and the arrival information indicates that the vehicle reaches the destination,
the vehicle performs an output so that the electronic tag which has not notified the completion notification is not to be unloaded from the vehicle.

6. The electronic tag update system of claim 4,
wherein until a predetermined time elapses,
the controller does not request the external server to transmit the sorting information.

* * * * *